INVENTOR.
GEORGE MANOS
BY
Philip D. Amins
ATTORNEY

INVENTOR.
GEORGE MANOS
BY Philip D. Amins
ATTORNEY 3,716,674
Patented Feb. 13, 1973

3,716,674

VARIABLE TIMING AUTOMATIC INTERRUPTER CIRCUIT FOR COMMON TELEPHONE SENDER EQUIPMENT

George Manos, Bridgeport, Conn., assignor to Porta Systems Corp., Roslyn, N.Y.

Filed Oct. 15, 1970, Ser. No. 81,044
Int. Cl. H04m 3/22
U.S. Cl. 179—18 FA 10 Claims

ABSTRACT OF THE DISCLOSURE

In a telephone system employing common sender equipment an automatic interrupter circuit for connection to a common sender for disconnecting said common sender from a particular subscriber line after a predetermined period of inactivity upon said particular subscriber line. The automatic interrupter circuit comprises a timing pulse generator adapted to feed pulses having a predetermined width and selectively variable repetition rate to said common sender to cause disconnection of the same from said particular subscriber line after the reception of two successive pulses. The timing pulse generator comprises a pulse shaping network connected to a frequency divider, in turn connected to a binary counter, the output of said binary counter being applied as a first input to a time coincidence gate decoder and the second input thereto being obtained from a time selector switch. The output of said binary counter is also connected as an input to a drive signal decoder and when a coincidence is detected by said time coincidence gate decoder a reset pulse is fed therefrom to said binary counter which results in a pulse having a fixed duration at the output of said drive signal decoder, which fixed duration pulse is indicative of the selected repetition rate of the timing pulse generator.

BACKGROUND OF THE INVENTION

In telephone offices it is necessary to employ various common components for use in conjunction with a much greater number of subscriber lines. One of these components is termed sender equipment the purpose of which is to address a subscriber line which is desirous of completing an outgoing call. The sender equipment receives the digital information supplied on the subscriber line and transmits the same to processing equipment which then completes the call.

The cost of the common sender equipment is very expensive whereby the greatest utilization must be made of the equipment employed. The number of pieces of common sender equipment is dependent, in part, upon the traffic pattern in a particular office and upon other types of common equipment employed at the particular facility. However, the number of senders which can be employed is a finite number much lower than the number of subscriber lines being serviced thereby, whereby the sender equipment employed is designed to operate at optimum capacity.

The common sender equipment is presently designed to remain on-line with a particular subscriber line for a particular period of time in dependence upon certain criteria. In particular if a subscriber commences dialing the call within a period of from thirty (30) to sixty (60) seconds, as will be discussed hereinafter, no problems are encountered and the equipment operates in accordance with a predetermined plan. If after initiating the call by dialing the first digit of the called number the subscriber then dials the remaining six (6) digits within a period of from thirty (30) to sixty (60) seconds, the call will be completed. If, however, a subscriber after dialing the first digit of a called number fails to dial the next six (6) successive digits of the number, they are tying up the common sender equipment. Thus, there is presently employed an electro-mechanical interrupting mechanism for limiting the time the common sender equipment may be connected to a particular subscriber line. The electro-mechanical interrupter mechanism comprises a rotating cam whose period of revolution is thirty (30) seconds and which upon the completion of one revolution activates a switch to produce an output pulse which is fed to a sender interrupter mechanism. Upon the reception of two successive pulses within a period of from thirty seconds to one minute, the sender is caused to be disconnected from the particular subscriber line to seek another subscriber line desiring to make an outgoing call. Upon disconnection from said particular subscriber line an overflow signal or tone appears on the line to indicate to the particular subscriber that he had been disconnected from the common sender, wherefore he must hang up and redial the call.

It is herein to be noted that the cam continuously rotates, whereby the first required disconnection pulse will be produced anywhere from zero to thirty seconds after the initial activation of the interrupter mechanism; the second pulse will always be produced after a period of thirty seconds. Thus, it will be apparent that the common sender equipment will be dedicated for a period of at least 30 seconds but which may extend up to 60 seconds, after the subscribing line has initiated the call and has failed to continue placing the same. If the caller should dial the next six (6) successive digits within the alloted time the interrupter circuit will not affect the operation of the common sender and the same will then function to complete the call.

The problem encountered with the presently employed electro-mechanical interrupter mechanism is that in some instances the traffic pattern exceeds the capabilities of the finite number of common senders which are employed, resulting in a subscriber wishing to originate an outgoing call failing to obtain a dial tone upon picking up the handset. In view of the fact that the electro-mechanical interrupter circuit employs a rotating cam whose revolutions per unit time is fixed, there is no way in which to compensate for periods of extremely heavy traffic.

SUMMARY OF THE INVENTION

Accordingly, it is the primary object of the present invention to provide a new and novel electronic variable timing automatic interrupter circuit for use in conjunction with common telephone sender equipment.

It is another object of the present invention to provide an interrupter circuit of the foregoing type which may be utilized in lieu of the existent electro-mechanical interrupter circuit or in conjunction therewith.

It is a further object of the present invention to provide an electronic variable timing automatic interrupter circuit wherein the variation in timing may be easily and simply varied in accordance with the necessitated use of the common sender equipment as dictated by the traffic patterns occuring at various times of the day.

It is still another object of the present invention to provide an electronic variable timing automatic interrupter circuit of the aforementioned type which includes means for limiting the lowest pulse repetition rate thereof to prevent premature and errant disconnection of the common sender equipment.

It is a more particular object of the present invention to provide an electronic variable timing automatic interrupter circuit which includes a time selector switch for predeterminedly selecting the periodicity of operation of the circuit and a binary counter, each of which provides one of the inputs to a time coincident gate decoder which upon detecting coincidence of the inputs thereto produces a reset pulse applied to the counter, thereby causing a drive signal decoder connected to the output of the binary counter to produce one of the two necessary pulses for disconnection of the common sender equipment.

BRIEF DESCRIPTION OF THE DRAWINGS

The foregoing and other objects, features and advantages of the present invention will become more apparent from the detailed description hereinafter considered in conjunction with the accompanying drawings wherein.

DESCRIPTION OF THE PREFERRED EMBODIMENT

Figure 1:
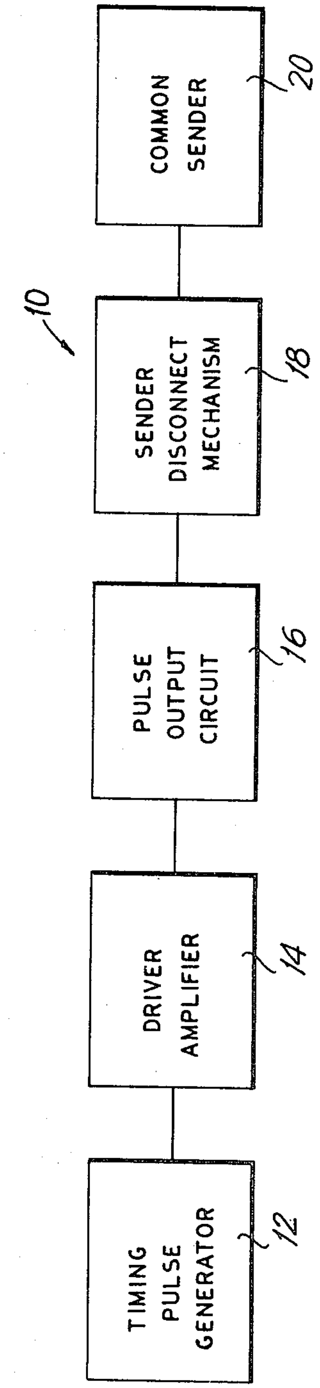
FIG. 1 is a block diagram of an electronic variable timing automatic interrupter circuit for common telephone sender equipment constructed in accordance with the principles of the present invention.

Referring now to the drawings and more particularly to FIG. 1 thereof, there is depicted a block diagram of an electronic automatic interrupter circuit for disconnection of a common sender constructed in accordance with the principles of the present invention and denoted generally by the reference number 10.

The automatic interrupter circuit 10 comprises a timing pulse generator 12 connected to a driver amplifier 14 in turn connected to a pulse output circuit 16 which is connected to a sender disconnect mechanism 18. The output of the sender disconnect mechanism 18 is connected to the common sender 20 and upon the application of two pulses to the sender disconnect mechanism 18 within a prescribed period of time causes the sender 20 to become disconnected from the subscriber line with which it is connected.

Figure 2:
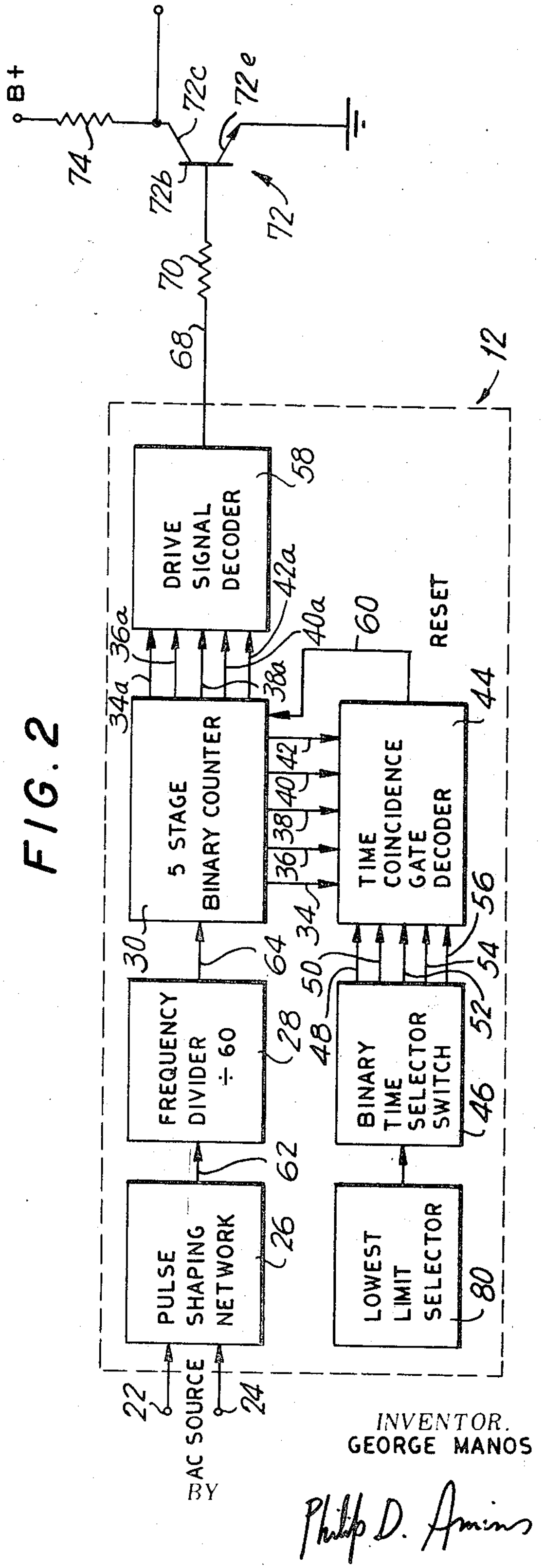
FIG. 2 is a block diagram of the time pulse generator depicted in FIG. 1.

A detailed block diagram of the timing pulse generator 12 is illustrated by FIG. 2. The generator 12 includes a pair of input terminals 22 and 24 connected to a pulse shaping network 26, the output of which is fed to a divide by sixty (60) frequency divider 28 which may be any suitable type of frequency divider which is well known in the art. The output of frequency divider 28 is fed to a five stage binary counter 30 which has a capacity of thirty two (32) bits. The counter 30 may be of any of the known types of binary counters, such as the types disclosed in Pulse, Digital and Switching Waveforms by Millman and Taub, published 1965 by McGraw-Hill, Inc., on pages 668 et seq. The outputs of the five stages of the counter 30 are fed via lead lines 34, 36, 38, 40 and 42 as the first input to a time coincidence gate decoder 44. A binary time selector switch 46 has leads 48, 50, 52, 54 and 56 connected as the second input to the time coincidence gate decoder 44. The outputs of the five stages of the counter 30 are also fed via lead lines **34*a*, 36*a*, 38*a*, 40*a*, and 42*a* to a drive signal decoder 58**.

The output of the time coincidence gate decoder 44 which is a pulse representative of the coincidence of the two inputs applied thereto, is fed via the lead 60 to the counter 30 and serves as a reset pulse therefor; thus, removing the potentials applied to the drive signal decoder 58 via lead lines **34*a*, 36*a*, 38*a*, 40*a* and 42*a* and causing an output pulse to appear from the decoder 58**, in a manner which will be described in detail hereinafter.

The time coincidence gate decoder 44 and the drive signal decoder 58 are of types which are well known in the art and thus no further discussion thereof is deemed to be necessary. However, these types of decoders are discussed and described in detail in Pulse, Digital and Switching Waveforms by Millman and Taub, published 1965 by McGraw-Hill, Inc. on pages 349 et seq.

Figures 3A, 3B, 3C, 3D, 3E, 3F, 3G, 3H, 3I, 3J, 3K:
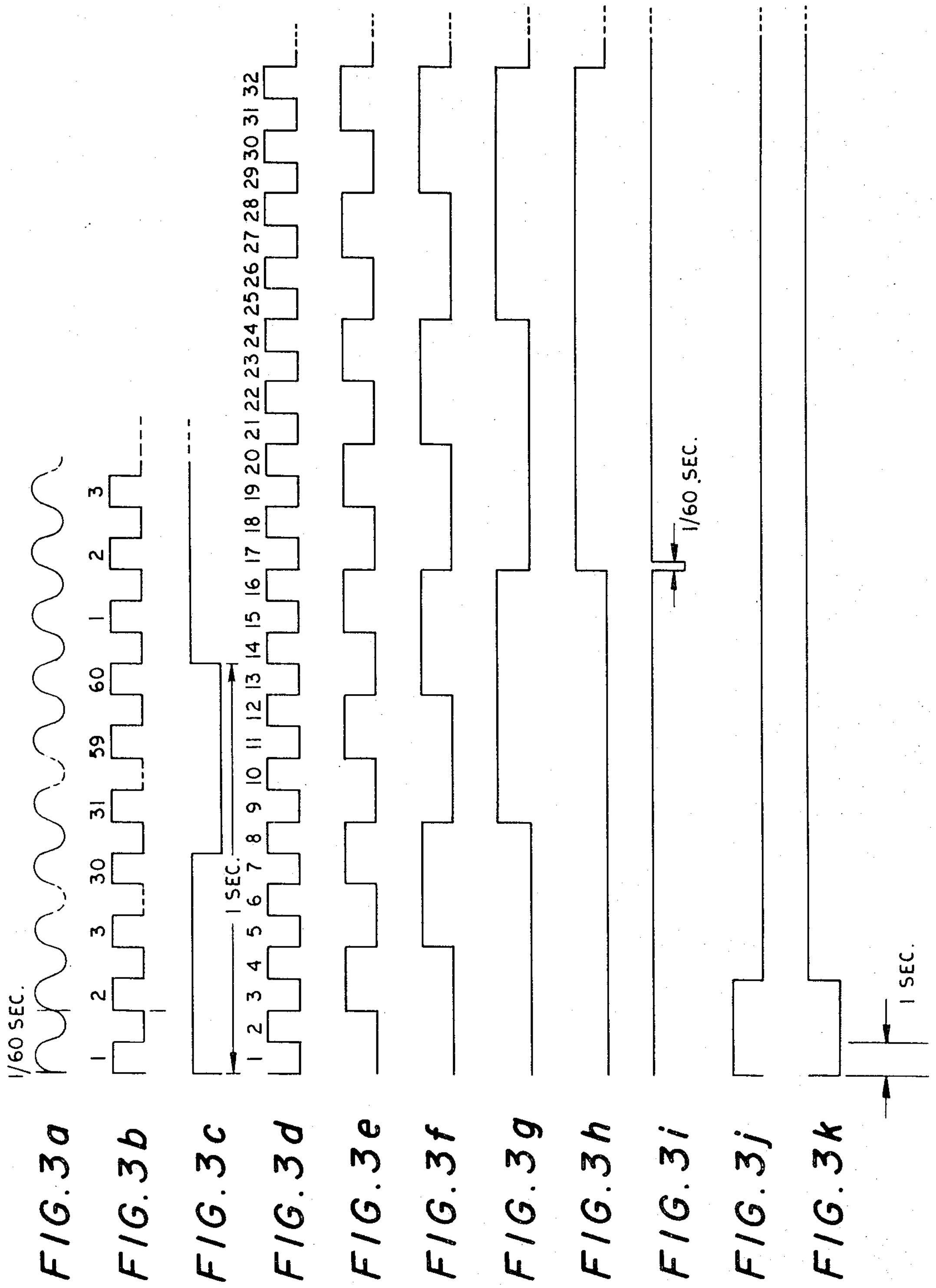
FIGS. 3*a* through 3*k* are voltage waveforms appearing at the various points of FIG. 2.

In the operation of the interrupter circuit 10 a 60 hertz signal, as shown in FIG. 3*a*, is applied across terminals 22 and 24 as the input to the pulse shaping network 26, the output of which produces square pulses of the same frequency, as seen in FIG. 3*b*. The square pulses appearing on line 62 are then applied as the input to frequency divider 28 which divides the frequency by a factor of 60 to produce the square wave pulses of FIG. 3*c* whose frequency is one pulse per second. The output from frequency divider 28 is then fed via lead line 64 as the input to the five stage binary counter 30. It is herein to be noted that since the input pulses applied to counter 30 have a frequency of 1 hertz, the pulses appearing at outputs 34 and **34*a* will be indicative of the passage of two seconds, at outputs 36 and 36*a* of four seconds, at outputs 38 and 38*a* of eight seconds, at outputs 40 and 40*a* of sixteen seconds and at outputs 42 and 42*a* of thirty two seconds. The voltage waveforms appearing at outputs 34, 34*a*; 36, 36*a*; 38, 38*a*; 40, 40*a* and 42, 42*a*** are depicted in FIGS. 3*d*, 3*e*, 3*f*, 3*g* and 3*h*, respectively.

The binary time selector switch 46 is designed to supply potential to the time coincidence gate decoder 44 via the leads 48, 50, 52, 54 and 56 thereof. The potential on each of the leads is representative of a binary input to the coincidence decoder 44. In particular, a potential on lead 48 represents $2^0$ or 1, on lead 50 represents $2^1$ or 2, on lead 52 represents $2^2$ or 4, on lead 54 represents $2^3$ or 8 and on lead 56 represents $2^4$ or 16.

Assuming that the binary switch 46 is activated to provide an input to the time coincidence gate decoder 44 on lines 48, 50, 52 and 54 whereby the input is for a 15 second time duration, then the counter will supply pulses to the decoder 44 via leads 34, 36, 38 and 40 when 15 seconds has elapsed there will be a coincidence detected by decoder 44. When this occurs a sharp negative output pulse having a duration of approximately 1/60 of a second, as shown in FIG. 3*l*, is produced by the decoder 44 and appears on line 60. This pulse is a reset pulse and upon application to counter 30 removes the outputs on lines 34, 36, 38, 40 and 42. However, as discussed hereinbefore, the outputs of the counter 30 also appear on lines **34*a*, 36*a*, 38*a* 40*a* and 42*a*, wherefore the reset pulse also removes the outputs on these lines. When this occurs; i.e., when there is a zero input to drive signal decoder 58** there is produced an output pulse of the configuration depicted in FIG. 3*j*. This pulse has a duration of three seconds and is fed via lead line 68 and a resistor 70 to the base **72*b* of an n-p-n transistor 72 which comprises the drive amplifier 14. The collector 72*c* is connected via a resistor 74 to a source of $B^+$ potential, while the emitter 72*e* is connected directly to ground. Thus, the amplifier 14 has a grounded emitter configuration. The application of the pulse to transistor 72** causes conduction for the period of the pulse and results in a similar shaped inverted pulse, as seen in FIG. 3*k*, appearing at the collector **72*c* which pulse is then transmitted to the pulse output circuit and thence to the sender disconnect mechanism 18 (FIG. 1). The sender disconnect mechanism 18 is designed to disconnect the common sender 20** from the calling subscriber line upon the reception of two successive pulses within a fixed predetermined interval of time.

Since the binary switch 46 has five separate inputs the repetition rate of the pulses necessary to disconnect the common sender 20 may be varied within wide limits from one to thirty two seconds by selectively activating particular combinations of the lines 48, 50, 52, 54 and 56. However, in practice it has been found advantageous to limit the minimum repetition rate to eight seconds. In order to prevent any lesser repetition rate from being selected at the switch 46, the same is provided with a lowest limit selector 80 connected thereto which limits the settings of the binary switch to select a pulse repetition rate from eight to thirty-two seconds. It will be appreciated by those skilled in the art that in actual practice the limit selector 80 will be incorporated into the design and structure of the binary switch 46.

The automatic interrupter circuit 10 may be employed in conjunction with the presently employed electro-mechanical cam apparatus or in lieu thereof since the fixed pulse repetition rate of thirty seconds is also available from the circuit 10. In the event a subscriber line making an outgoing call is connected to the common sender 20 and has not initiated a call or after initiating a call has not completed the same within the predetermined allotted time, the automatic interrupter circuit will disconnect the common sender from the subscriber line. It is herein to be noted that at the time the circuit is in operation, if the selector switch 46 is set for fifteen seconds, the first pulse may be produced anywhere from zero to fifteen seconds after being placed on line with the common sender. However, the second pulse will occur precisely fifteen seconds after the first pulse. Thus, a subscriber is allotted anywhere from fifteen to thirty seconds after dialing a first digit to dial the next six (6) successive digits of the called number which should provide ample time for the subscriber.

It is also to be noted that while in the present application there has been described a separate sender disconnect mechanism 18 and a common sender 20, in actual practice the same comprise a singular apparatus having a sequencing index dependent upon the pulses supplied thereto. Thus, the application of the pulses to the common sender apparatus causes the switching sequence thereof whereby the application of two pulses thereto, as described and discussed hereinbefore, causes the disconnection of the sender from the calling subscriber line.

While we have shown and described the preferred embodiment of our invention, it will be apparent to those skilled in the art that there are many modifications, changes and improvements which may be made therein without departing from the spirit and scope thereof.

What is claimed is:

1. A telephone system having a plurality of subscriber lines and employing common sender equipment, an electronic interrupter circuit for causing the automatic disconnection of said common sender equipment from a subscriber line after the expiration of a permitted predetermined period of inactivity upon said subscriber line, said electronic interrupter circuit comprising a timing pulse generator having a pulse output rate which defines said permitted predetermined period of inactivity, and means for selectively varying the permitted predetermined period of inactivity upon said subscriber line, sender disconnection means operatively associated with said common sender, means for connecting the output of said timing pulse generator to said sender disconnection means, said connecting means comprising:

a driver amplifier, and a pulse output circuit, said driver amplifier being connected to the output of said timing pulse generator, and said pulse output circuit being connected between said driver amplifier and said sender disconnection means.

2. A telephone system having a plurality of subscriber lines and employing common sender equipment, an electronic interrupter circuit for causing the automatic disconnection of said common sender equipment from a subscriber line after the expiration of a permitted predetermined period of inactivity upon said subscriber line, said electronic interrupter circuit comprising:

a timing pulse generator having a pulse output rate which defines said permitted predetermined period of inactivity, and means for selectively varying the permitted predetermined period of inactivity upon said subscriber line, sender disconnection means operatively associated with said common sender, means for connecting the output of said timing pulse generator to said sender disconnection means, said predetermined period of inactivity being variable between a time equal to the pulse output rate of said timing pulse generator and a time twice that of said pulse output rate, and said sender disconnection means being operative upon the reception of two successive pulses from said timing pulse generator for a predetermined condition of said subscriber line to cause disconnection of said common sender from said subscriber line.

3. A telephone system having a plurality of subscriber lines and employing common sender equipment, an electronic interrupter circuit for causing the automatic disconnection of said common sender equipment from a subscriber line after the expiration of a permitted predetermined period of inactivity upon said subscriber line, said electron interrupter circuit comprising:

a timing pulse generator having a pulse output rate which defines said permitted predetermined period of inactivity, and means for selectively varying the permitted predetermined period of inactivity upon said subscriber line, sender disconnection means operatively associated with said common sender, means for connecting the output of said timing pulse generator to said sender disconnection means, said timing pulse generator comprising:

a pulse source, a counter, a time coincidence gate decoder, and a drive signal decoder, means for connecting said pulse source to said counter, means for connecting the output of said counter as an input to said drive signal decoder and as a first input to said time coincidence gate decoder, said means for selectively varying the permitted predetermined period of inactivity comprising a time selector switch, means for connecting the output of said time selector switch as a second input to said time coincidence gate decoder, and means for connecting the output of said time coincidence gate decoder as a reset input to said counter, whereby a coincidence detection by said coincidence gate decoder results in resetting of the counter and simultaneously removing the input to said drive signal decoder resulting in an output pulse therefrom.

4. A telephone system in accordance with claim 3, wherein:

said counter is of the binary type, and said time selector switch is of the binary type.

5. A telephone system in accordance with claim 4, wherein said binary counter has a plurality of counting stages.

6. A telephone system in accordance with claim 5, wherein said binary counter is a five stage counter.

7. A telephone system in accordance with claim 5, wherein said pulse source comprises:

a pulse shaping network, and a frequency divider, a source of A.C. potential, means for connecting the input of said pulse shaping network to said source of A.C. potential, means for connecting the output of said pulse shaping network to the input of said frequency divider, and means for connecting the output of said frequency divider to the input of said binary counter.

8. A telephone system in accordance with claim 7, wherein:

said binary time selector switch is selectively operable between a fixed low time value and a fixed high time value.

9. A telephone system in accordance with claim 8, wherein:

said binary time selector switch includes means operatively connected therewith to limit the lowest selectable time to a value intermediate said fixed low and high time values.

10. A telephone system in accordance with claim 7, wherein:

said frequency divider is operative to divide the frequency of the signal applied thereto by a factor of sixty.

References Cited

UNITED STATES PATENTS

| | | | |
|---|---|---|---|
| 2,663,763 | 12/1953 | Schmitz et al. | 179—27 G |
| 3,366,778 | 1/1968 | Stefano | 179—18 EB |
| 3,312,786 | 4/1967 | Pearce et al. | 179—18 EB |
| 3,636,259 | 1/1972 | Karras | 179—7.1 R |

OTHER REFERENCES

Electronic and Radio Engineering, by Terman, pp. 632, 656 and 657, McGraw-Hill, 1955.

THOMAS W. BROWN, Primary Examiner